United States Patent
Yue et al.

(10) Patent No.: US 7,936,086 B2
(45) Date of Patent: May 3, 2011

(54) PARALLELED HVDC BUS ELECTRICAL POWER SYSTEM ARCHITECTURE

(75) Inventors: Edwin Yue, Unionville (CA); Jean-Luc Derouineau, Phoenix, AZ (US); Wayne T. Pearson, Oro Valley, AZ (US)

(73) Assignee: Honeywell International, Inc., Morristown, NJ (US)

( * ) Notice: Subject to any disclaimer, the term of this patent is extended or adjusted under 35 U.S.C. 154(b) by 46 days.

(21) Appl. No.: 12/043,374

(22) Filed: Mar. 6, 2008

(65) Prior Publication Data

US 2009/0224599 A1    Sep. 10, 2009

(51) Int. Cl.
*B60L 1/00* (2006.01)
*H04B 15/00* (2006.01)

(52) U.S. Cl. .......................................... 307/10.1; 307/84

(58) Field of Classification Search .................... 307/43, 307/10.1, 64, 65, 84
See application file for complete search history.

(56) References Cited

U.S. PATENT DOCUMENTS

| | | | |
|---|---|---|---|
| 5,899,411 A * | 5/1999 | Latos et al. ................. | 244/53 A |
| 6,344,700 B1 * | 2/2002 | Eisenhauer et al. ............ | 307/64 |
| 6,704,625 B2 | 3/2004 | Albero et al. | |
| 6,778,414 B2 | 8/2004 | Chang et al. | |
| 7,285,871 B2 | 10/2007 | Derouneau | |
| 7,439,634 B2 * | 10/2008 | Michalko ......................... | 307/43 |
| 2004/0102109 A1 * | 5/2004 | Cratty et al. .................. | 440/113 |
| 2006/0061213 A1 | 3/2006 | Michalko | |
| 2008/0174177 A1 * | 7/2008 | Langlois et al. ............... | 307/9.1 |

* cited by examiner

*Primary Examiner* — Michael Rutland Wallis
(74) *Attorney, Agent, or Firm* — Oral Caglar, Esq.

(57) ABSTRACT

A power generation and distribution system utilizes two or more AC generators each of which may be driven by a separate prime mover such as a turbine. The generators may be driven at different rotational speeds. AC power from the generators may be rectified and applied to a common DC bus. Electrical loads may be applied to the common bus and may establish an electrical power requirement. Allocation of electrical power requirement may be made among the generators based on power available from the turbines.

11 Claims, 5 Drawing Sheets

PARALLELED HVDC BUS ELECTRICAL POWER SYSTEM ARCHITECTURE

BACKGROUND OF THE INVENTION

The present invention is in the field of electrical power generation and distribution systems and, more particularly, systems which may be employed in aerospace vehicles.

In a typical prior-art aerospace vehicle such as an aircraft, there may be many different requirements for electrical power. Many functions may be performed with electrical motors and controls.

On-board generators may be driven with various prime movers such as turbine engines. In many cases, a prime mover may drive a generator only as an ancillary function. A typical primary function for a prime mover, such as a turbine engine, may be to provide propulsion thrust for the aircraft. In the context of its primary function, the prime mover may operate at varying rotational speeds. A generator coupled to a shaft of such a variable-speed prime mover may rotate at varying speeds.

As aircraft designs evolve, more of the ancillary power requirements are being met with electrical systems instead of previously used bleed air and hydraulic systems. An evolving design concept has become known as "more electric aircraft" (MEA). In the context of MEA designs, electrical loads on generators may be become quite large. Indeed, a generator load may become large enough to negatively affect engine thrust output. Because of these increased electrical power demands in MEA design, a single generator driven by a single prime mover may not be capable of producing all of the electrical power for an aircraft. Consequently, an aircraft may be provided with multiple generators, each driven by different prime movers.

Because prime movers have varying rotational speed during operation of the aircraft, rotational speed of any particular generator may differ from rotational speed of other generators on the aircraft. In the case of alternating current (AC) generators, each AC generator may produce AC power at a frequency and phase angle different from the other AC generators. It may be said that, each generator may produce "variable frequency" electrical power.

Certain aircraft operating conditions may arise in which a particular generator may be subjected to a particularly high load demand during a time when its associated prime mover may be performing its primary function (e.g. producing thrust) at a relatively low speed. In order to meet the high electrical power requirement of an attached generator, it may be necessary to increase the speed of the prime mover, even though such an increase in speed may not otherwise be required for the primary function of the prime mover.

Excessive fuel may be consumed if and when a prime mover is operated at a speed greater than required for its primary role. Certain design efforts have been directed to this issue. For example U.S. Pat. No. 7,285,871 (Jean Luc Derouineau) issued Oct. 23, 2007, discloses multiple generators that may be driven on different shafts of a turbine machine. The turbine machine may have a low-pressure turbine output shaft and a high-pressure turbine output shaft. A separate generator may be driven by each of the shafts. Electrical outputs of the generators may be shared and controlled so that electrical loads may be allocated to either the low-pressure turbine or the high-pressure turbine as a function of turbine operating speed. This allocation may facilitate efficient operation of the turbine machine.

This prior-art power allocation method may require paralleling of two or more AC generators onto a common power bus. Successful paralleling of AC generator outputs may require matching of frequency of the generators. Thus this prior-art method, when employed with AC generators, may be practical only when the AC generators operate at the same rotational speed. Alternatively, as in well understood prior art, the generators may be driven via a constant speed transmission to match their frequency and phase, or may use power electronics to synthesize a matched AC output. Both of these techniques require large, complex and expensive devices to facilitate paralleling.

Many MEA aircraft employ multiple turbines that may operate at different speeds. Each of the turbines may drive AC generators. It has heretofore not been practical to allocate electrical power requirements of multiple-engine aircraft to all of the generators of the aircraft as required by the operational conditions.

As can be seen, there is a need to provide power generation and distribution systems in which AC power produced by multiple generators operating at different speeds may be paralleled to a common bus. Additionally, there is a need to provide such a system in which electrical loads may be allocated to any prime mover of a multiple-engine aircraft, or any turbine of a multiple-turbine prime mover.

SUMMARY OF THE INVENTION

In one aspect of the present invention, an apparatus for generating and distributing electrical power comprises a first alternating current (AC) generator driven at a first rotational speed, a second AC generator driven at a second rotational speed different from the first speed, a common direct current (DC) bus, fed from either of the generators (e.g., via a rectifier), supplying electrical power to electrical loads connected to the common bus, and a controller for allocating portions of the electrical load among the first and the second generators.

In another aspect of the present invention, an apparatus for generating and distributing electrical power in an aircraft with multiple turbines comprises a first alternating current (AC) generator driven by a first turbine at a first rotational speed, a second AC generator driven by a second turbine at a second rotational speed different from the first speed, and a common direct current (DC) bus interconnected with the first and second generators (e.g., via rectifiers). The common bus is selectively connected to electrical loads that produce the electrical power demand. A controller is provided to selectively allocate portions of the electrical power demand among the first and the second generators.

In still another aspect of the present invention, a method for producing and distributing electrical power in an aircraft comprises the steps of driving a first AC generator at a first rotational speed, driving a second AC generator at a second rotational speed different from the first speed, supplying electric power from the first and second generators to a common DC bus (e.g. via rectifiers), supplying electric power from the DC bus to electrical loads that produce the electrical power demand, and allocating the electrical power demand among the first and second generators.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Broadly, the present invention may be useful for distributing electrical power demands among various prime movers. More particularly, the present invention may provide a power allocation system that may distribute electrical power requirements among multiple prime movers of a vehicle. The present invention may be particularly useful in vehicles such as aircraft with multiple turbines.

In contrast to prior-art aircraft electrical power systems, among other things, the present invention may provide for combining, on a common bus, electrical power produced by multiple AC generators which may be driven at rotational speeds which may differ for each generator. The present invention, instead of paralleling AC power from different generators as in the prior art, may convert AC power from individual generators into DC power and then parallel the resultant DC power of multiple generators onto a common bus. Additionally, the present invention may provide generator output controls to allocate electrical power demands to various prime movers having differing rotational speeds.

Figure 1:
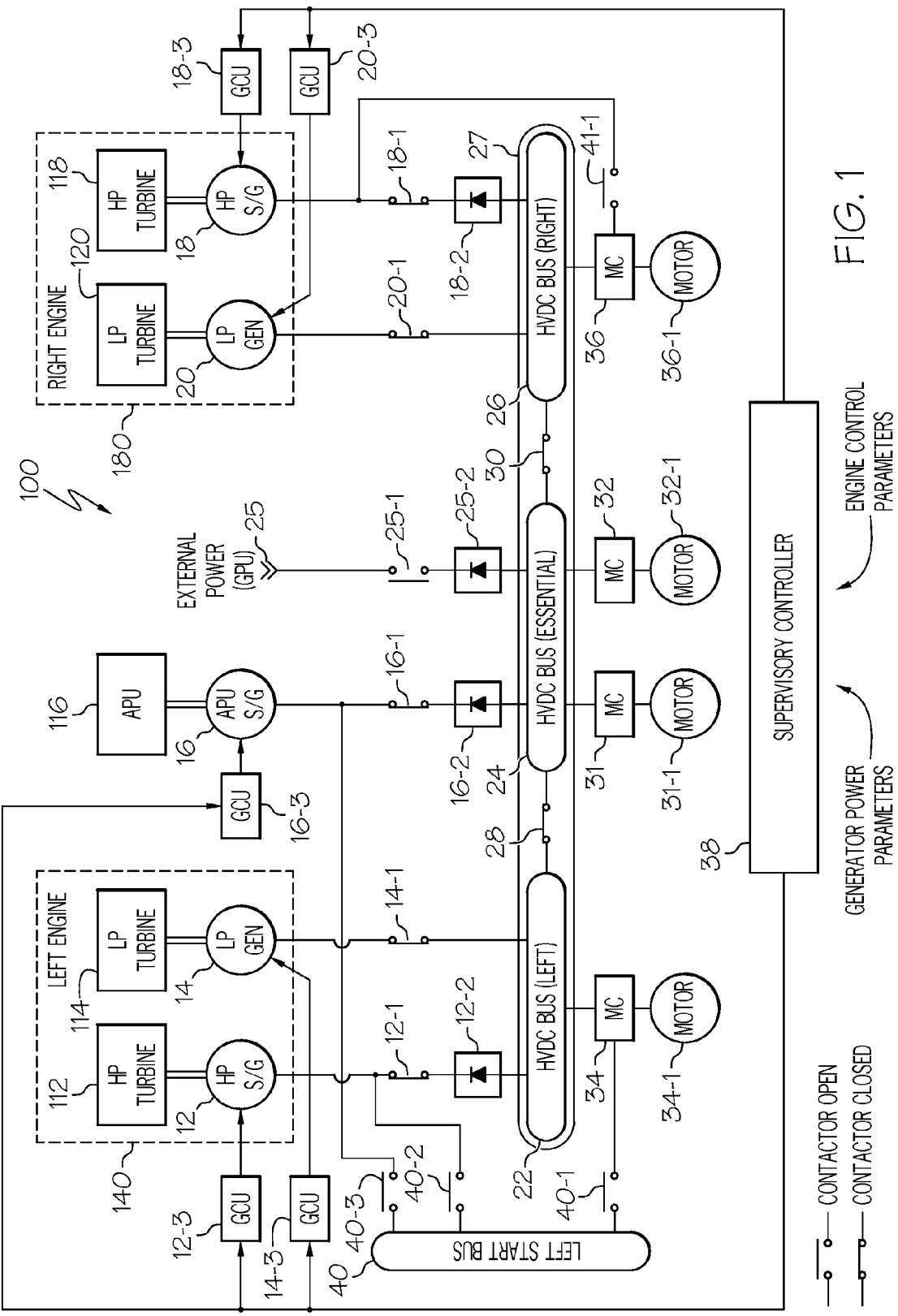
FIG. 1 is block diagram of a power system in accordance with the invention.

Referring now to FIG. 1, an exemplary electrical power system is designated generally by the numeral 100. The power system 100 may be utilized in an aircraft (not shown) which may have multiple turbines and/or multiple engines. The power system 100 may comprise multiple electrical generators, such a left-hand HP starter/generator 12 which may be driven by a high-pressure turbine 112 of a left engine 140, a left-hand LP generator 14 which may be driven by a low-pressure turbine 114 of the left engine 140, an APU starter/generator 16 which may be driven by an auxiliary power unit 116, a right-hand HP starter/generator 18, which may be driven by a high-pressure turbine 118 of a right engine 180, and a right-hand LP generator 20 which may be driven by a low-pressure turbine 120 of the right engine 180.

The power system 100 may also comprise electrical buses. A left bus 22 may be interconnected with the generators 12 and 14. A main power bus 24 may be interconnected with the generator 16 and may also be selectively interconnected with a ground power unit (GPU) at an external power entry point 25. A right power bus 26 may be interconnected with the generators 18 and 20. The buses 22, 24 and 26 may also be interconnected with one another with bus-tie contactors 28 and 30. In that regard, the buses 22, 24 and 26 may be considered to be sub-buses of a common bus 27. The buses 22, 24 and 26 may be direct current (DC) buses and may operate with an exemplary voltage of about +/−270 volts DC During normal flight operation of the aircraft the contactors 28 and 30 may be closed so that the buses 22, 24 and 26 may be electrically interconnected. Contactors 12-1, 14-1, 16-1, 18-1 and 20-1 may also be closed during normal flight conditions. It may be seen that all of the generators 12, 14, 16, 18 and 20 may be interconnected with all of the buses 22, 24 and 26 in normal flight conditions.

The left engine HP generator 12 may be an AC generator operating at a first speed and the right engine HP generator 18 may be an AC generator operating at a second speed different from the first speed. But the generators 12 and 20 may be interconnected with their respective DC buses 22 and 26 though rectifiers 12-2 and 18-2 respectively. Similarly the APU generator 16 may be an AC generator operating at still another speed and its output power may be applied to the DC bus 24 through a rectifier 16-2.

The generators 14 and 20 may be DC generators and may supply power to their respective buses 22 and 26 in parallel with the AC generators 12, and 18. It may be seen then, that electrical power from the generators 12, 14, 16, 18 and 20 may be pooled together on the buses 22, 24 and 26 during normal flight operations, irrespective of whether the generators produce AC or DC power.

The bus 24 may be interconnected to provide power to various motor controllers or other loads, symbolically designated herein as motor controllers 31 and 32. Any number of motor controllers may be interconnected with the bus 24 in accordance with the present invention. An exemplary number of two motor controllers, 31 and 32 are illustrated in FIG. 1. The exemplary motor controllers 31 and 32 may control exemplary motors 31-1 and 32-1 which may perform general aircraft operating functions that may be associated with normal flight conditions.

The buses 22 and 26 may be interconnected with engine starting controllers 34 and 36 respectively. The controllers 34 and 36 may be employed during APU and engine starting operations for the aircraft, which operations are hereinafter described. Additionally, the motor controller 34 and 36 may control other exemplary motors designated by the numerals 34-1 and 36-1 respectively.

During normal flight operations, the exemplary motor controllers 31, 32, 34 and 36 may provide control for their respective exemplary motors 31-1, 32-1, 34-1 and 36-1. The motors may be either AC or DC motors and they may be configured to operate at high or low voltages. The motor controllers may extract +−270 volt DC power from the bus 27 and convert the power into a form that may be properly used by the motors.

A supervisory controller 38 may be interconnected with sensors (not shown) to monitor generator power and engine control units (not shown) so that proper portions of loads may be allocated to any one or more of the generators 12, 14, 16, 18 or 20 during normal flight operations. Allocation may be performed by appropriate signaling from the supervisory controller 38 to generator control units (GCU) 12-3, 14-3, 16-3, 18-3 and 20-3. Each of the GCU's 12-3, 14-3, 16-3, 18-3 and 20-3 may provide control of electrical output of their respective generators 12, 14, 16, 18 and 20.

By way of example, the GCU's may define a power share their respective generators. Each of the generators may produce power in according to its commanded share. Thus a generator that is assigned an exemplary share of 25% may produce 25% of the total power demand. Power share of the generators 12, 14, 16, 18 and 20 may be changed continuously by the GCU's in response to changes of electrical power requirements and availability of turbine power.

Allocation of electrical power requirement may be performed to optimize turbine efficiency. For example, if flight conditions demand particularly low power extraction from the high-pressure turbines 112 and 118, electrical load may be reduced on generators 12 and 18 by reducing their duty cycle. The motors 31-1, 32-1, 34-1 and 36-1 may still consume an undiminished amount of electrical energy during this period, but the balance of the total electrical energy may be provided by the low pressure turbine generators 14 and/or 20. In other words, a larger portion of the overall electrical power requirements of the aircraft could be extracted from the low-pressure turbines during this period.

Conversely, electrical power requirements may be allocated to the high-pressure turbines 112 and/or 118 at times when this may provide the best engine operating performance. Additionally electrical power requirements may be re-allocated or shifted from the low pressure generators 14 and/or 20 or the high pressure generators 12 and/or 18 to the APU generator 16.

Figure 2:
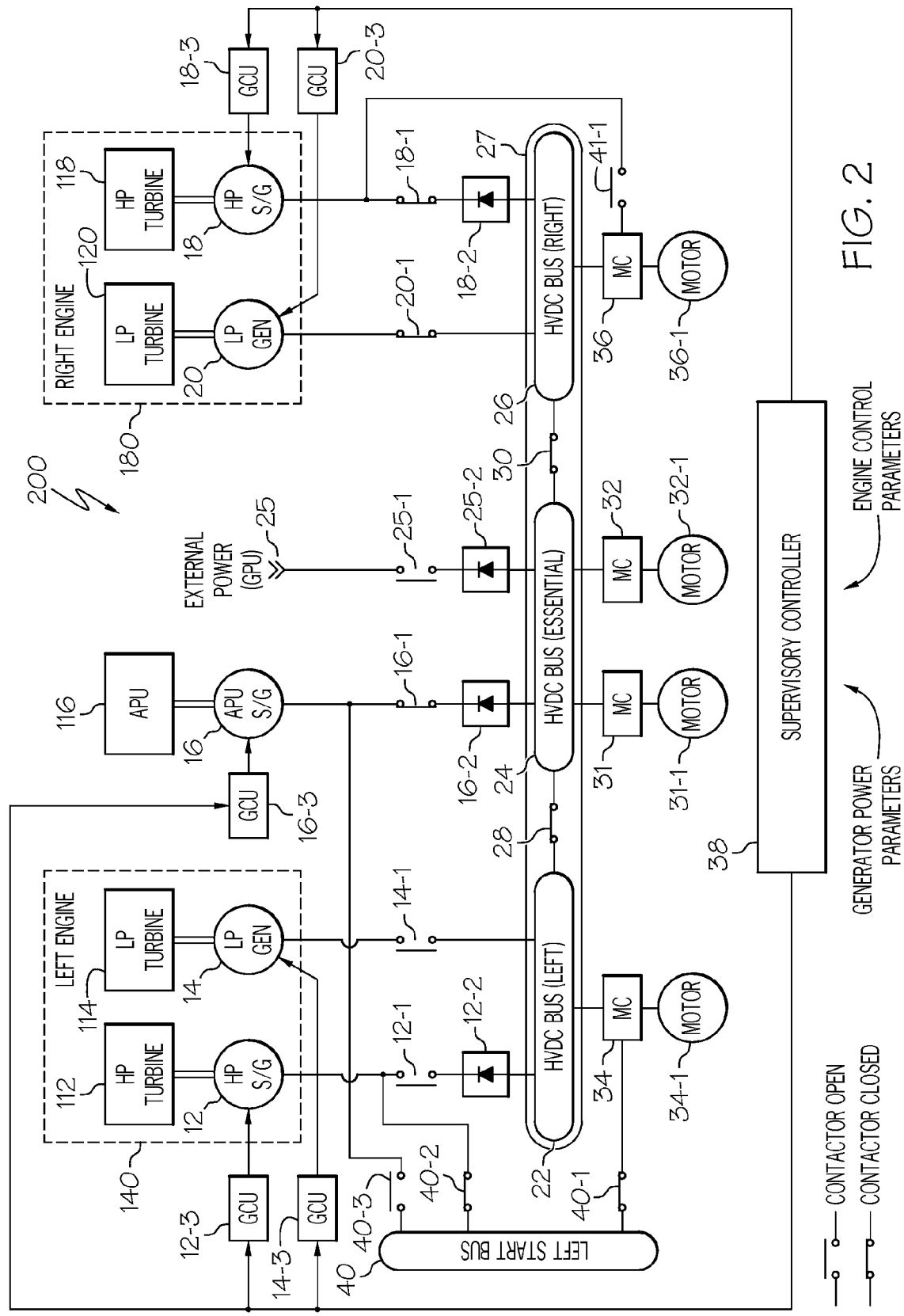
FIG. 2 is a block diagram of the power system of FIG. 1 in an engine starting mode of operation in accordance with the invention.

Referring now to FIG. 2, it may be seen how the power system 100 may be employed during a start-up on an exemplary engine. In this case, startup of the left engine 140 may be illustrated. In FIG. 2, it may be seen that a starter bus 40 may be provided power for starting from the motor controller 34 through a contactor 40-1. Power to the motor controller 34 may be provided from the generators 16, 18 and/or 20 because the contactors 16-1, 18-1 and 20-1 may be closed. For main engine starting, power from the starter bus 40 may be provided to the starter/generator 12 through a contactor 40-2 which may be closed. The GCU 12-3 may produce commands which actuate the starter/generator 12 as a starter motor.

For APU starting, power from the starter bus 40 may be provided to the APU starter/generator 18 through a contactor 40-3 which may be closed.

If starting with ground power is required, a contactor 25-1 may also be closed so that power from the ground power unit may be supplied through the entry point 25. The external power may be converted to DC by rectifier 25-2, to the common bus 27 and the motor controller 34 and then on to the starter/generator 12.

It may be noted that the bus-tie contactors 28 and 30 may remain closed during starting operations, just as they may remain closed during normal flight operation of the aircraft. Thus the buses 22, 24 and 26 may continue to provide collective pooling of electrical power for the aircraft.

Figure 3:
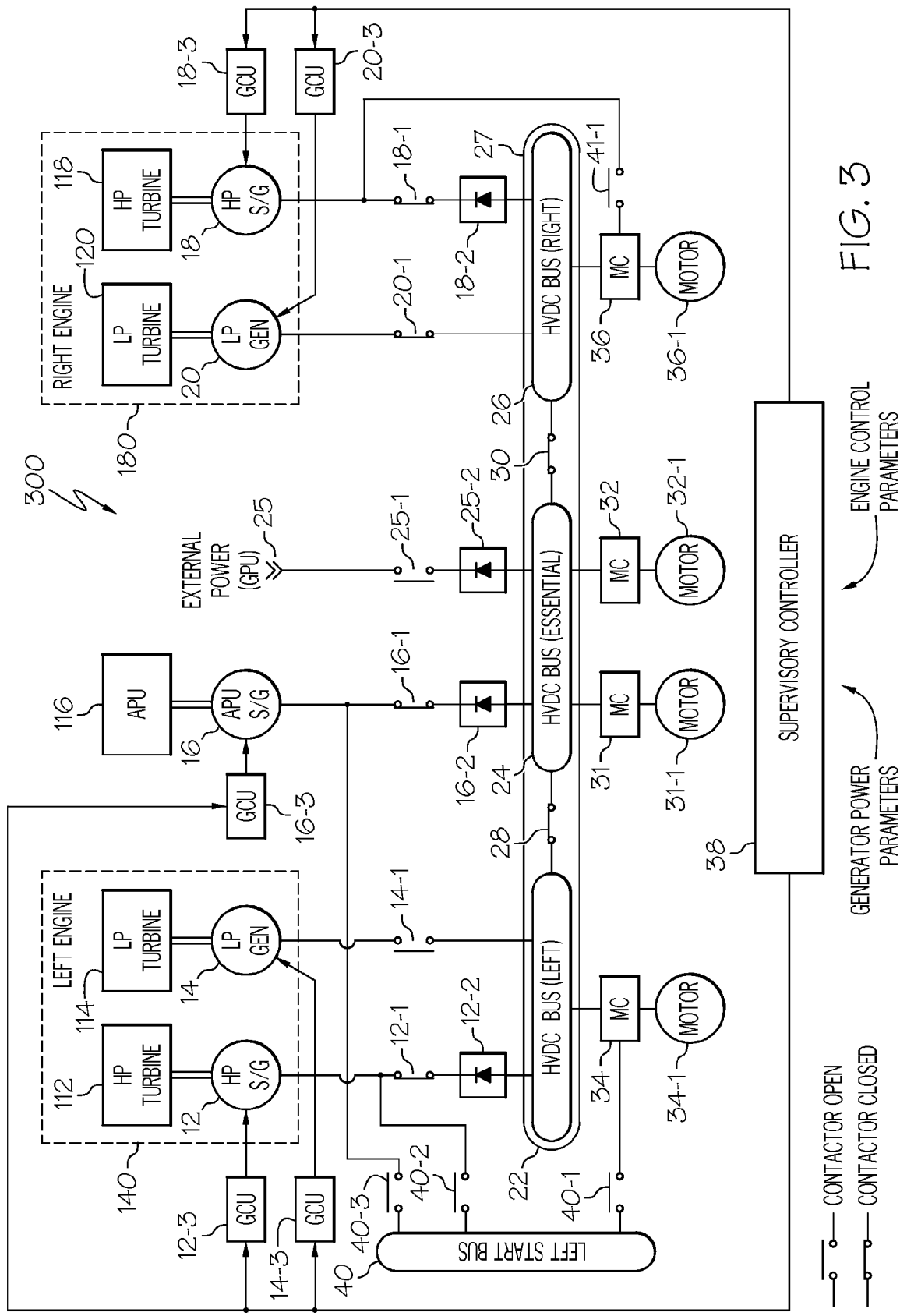
FIG. 3 is a block diagram of the power system of FIG. 1 in a failed-generator mode of operation in accordance with the invention.

Referring now to FIG. 3, it may be seen how the power system 100 may operate in the event of a failure of a generator. By way of example a failure of the generator 14 may be illustrated. In this case, the contactor 14-1 may be opened and the generator 14 may be disconnected from the bus 22. The contactors 28 and 30 may remain closed so that the buses 22, 24 and 26 may remain interconnected. Thus in spite of a partial loss of power to the bus 22, the motor 34-1 may be provided with power from the other generators 12, 16, 18 and 20.

Figure 4:
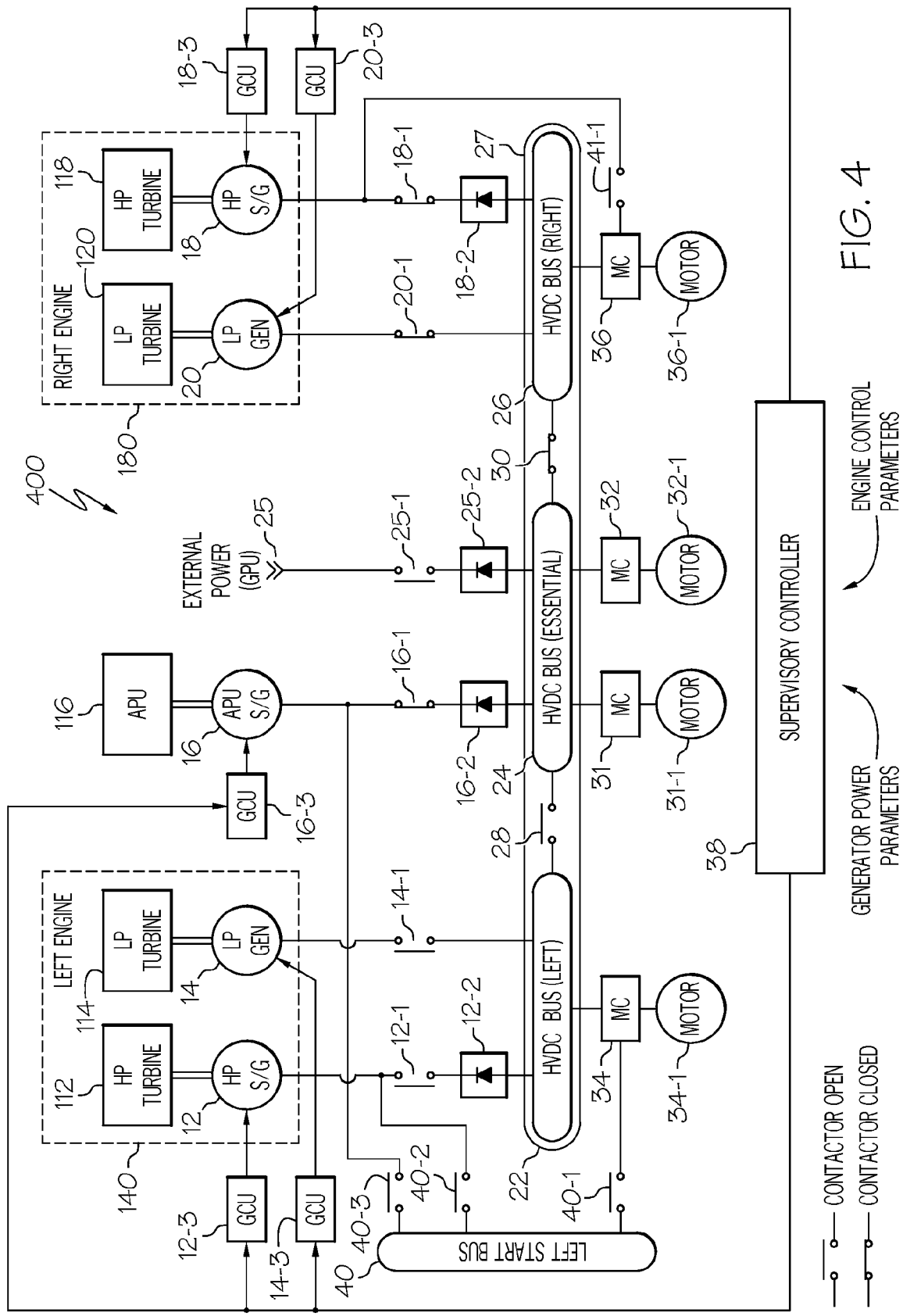
FIG. 4 is a block diagram of the power system of FIG. 1 in a failed-bus mode of operation in accordance with the invention.

Referring now to FIG. 4, it may be seen how the power system 100 may operate in the event of a short-circuit failure of a bus. By way of example, a short-circuit failure of the bus 22 may be illustrated. In this case, the contactor 12-1, 14-1 and 28 may be opened. The bus 22 may be thus electrically isolated from the electrical power of the aircraft. The contactor 30 may remain closed so that the buses 24 and 26 may remain interconnected. Thus in spite of failure of the bus 22, the motors 31-1, 32-1 and 36-1 may still be provided with power from the generators 16, 18 and 20. This is because the buses 22, 24 and 26 may selectively be isolated from one another electrically by the contactors 28 and 30.

Figure 5:
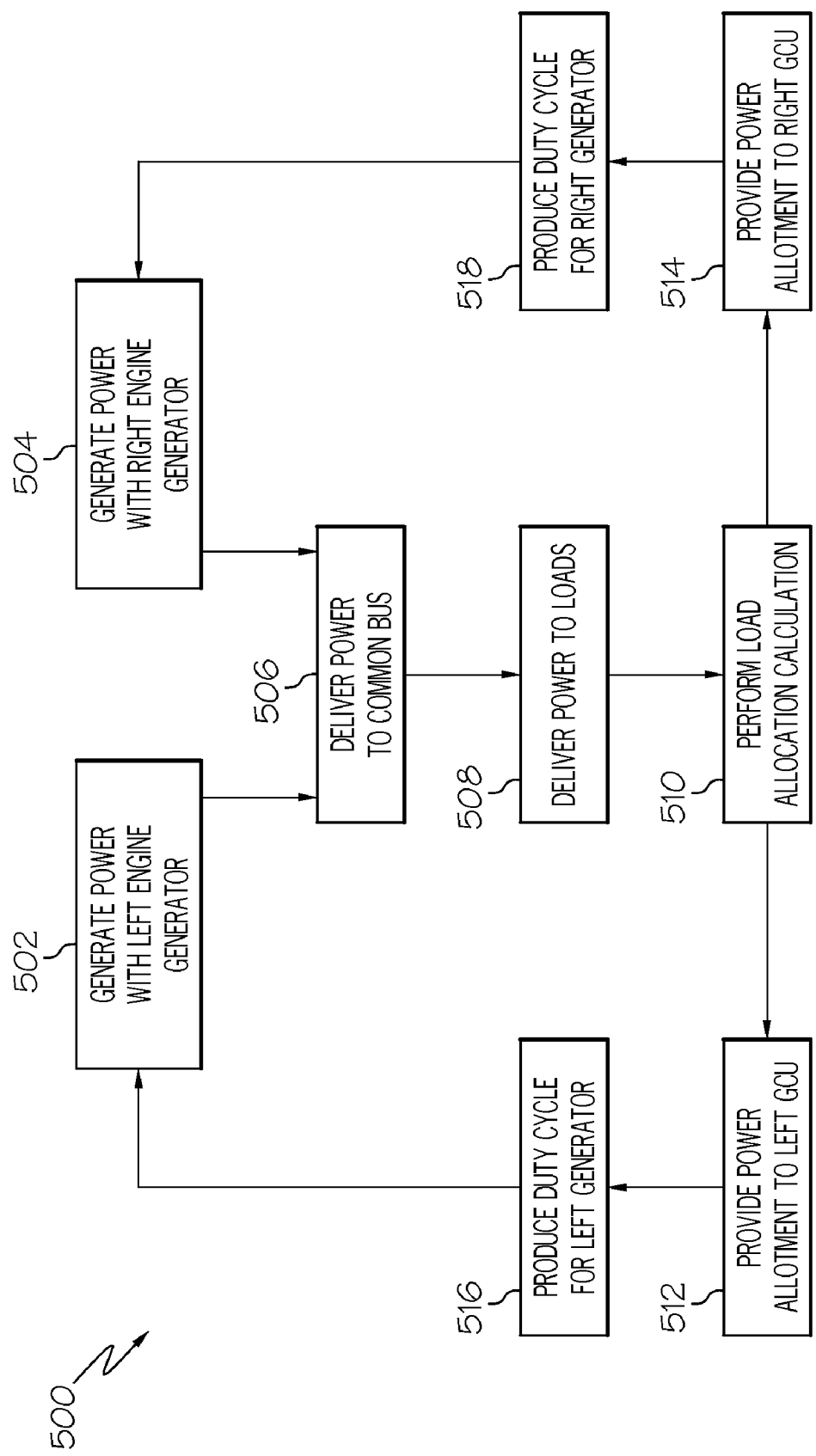
FIG. 5 is a flow chart of a method of generating and controlling electrical power in accordance with the present invention.

Referring now to FIG. 5, in one embodiment of the present invention, a method may be provided for generating and distributing electrical power on an aircraft. In step 502 of a method 500, electrical power may be generated in a first generator (e.g. the AC generator 12 driven by the left hand high-pressure turbine 112). In a step 504, electrical power may be generated in a second generator (e.g. the AC generator 18 driven by the right hand high-pressure turbine 118).

In a step 506, power generated in steps 502 and 504 may be supplied to a common bus (e.g. by rectifying AC outputs of generators 12 and 18 and supplying power to interconnected buses 22, 24 and 26). In a step 508, power may be delivered to electrical loads (e.g. through interconnections between motor controller 31, 32, 34 and 36 and the buses 22, 24 and 26).

In a step 510, a load allocation calculation may be performed (e.g. with the supervisory controller 38). In a step 512, a calculated power requirement allotment may be provided to a GCU for the first generator (e.g. the GCU 12-3 for the generator 12). In a step 514, a calculated power requirement allotment may be provided to a GCU for the second generator (e.g. the GCU 18-3 for the generator 18).

In a step 516, a power share for the first generator may be produced on the basis of the power requirement allotment provided in step 512. Step 502 may then be performed in accordance with the power share produced in step 516. Similarly, in a step 518, a power share for the second generator may be produced on the basis of the power requirement allotment provided in step 514. Step 504 may then be performed in accordance with the power share produced in step 518.

It should be understood, of course, that the foregoing relates to exemplary embodiments of the invention and that modifications may be made without departing from the spirit and scope of the invention as set forth in the following claims.

We claim:

1. Apparatus for generating and distributing electrical power on an aircraft comprising:
   a first AC generator driven by a first engine of the aircraft at a first rotational speed, the first AC generator delivering power directly to a common DC bus via a first rectifier;
   a second AC generator driven by the first engine or a second engine of the aircraft at a second rotational speed different from the first speed, the second AC generator delivering power directly to the common DC bus via a second rectifier;
   the common DC bus for supplying electrical power from either of the generators to an electrical load connected to the common DC bus without paralleling AC power from the first AC generator and the second AC generator; and
   a supervisory controller configured to provide signaling to generator control units (GCU) to vary duty-cycles of the first and second AC generators to allocate portions of the electrical load among the first and the second AC generators while the first and second AC generators and the electrical load remain connected to the common DC bus, and
   wherein generator power share is determined by the supervisory controller responsively to power available from the engines.

2. The apparatus of claim 1 wherein the common DC bus comprises sub-buses that are selectively electrically isolated from each other.

3. The apparatus of claim 2 wherein:
   a first one of the sub-buses is directly interconnected with the first generator but not the second generator;
   a second one of the sub-buses is directly interconnected with the second generator but not the first generator, whereby power is supplied to the electric load in the event of a short-circuit failure of either of the sub-buses.

4. The apparatus of claim 1 wherein the first and second generators are selectively electrical isolatable from the common DC bus so that continued provision of power to the electric load is achieved in the event of failure of either the first or the second generator.

5. Apparatus for generating and distributing electrical power in an aircraft with multiple turbines comprising:
a first AC generator driven by a first turbine at a first rotational speed;
a second AC generator driven at a second turbine at a second rotational speed different from the first speed;
a common DC bus interconnected with the first and second generators without paralleling AC power from the first AC generator and the second AC generator;
the common bus being selectively connected with an electrical load, which electrical load produces an electrical power requirement;
a supervisory controller configured to allocate portions of the electrical power requirement among the first and the second generators responsively to availability of turbine power, wherein
the supervisory controller continuously allocates the portions of the electrical power requirement by continuously varying the output voltage and power of the first AC generator and the second AC generator.

6. The apparatus of claim 5 wherein:
the first turbine comprises a first portion of an engine of the aircraft; and
the second turbine comprises a second portion of the engine of the aircraft.

7. A method for producing and distributing electrical power in an aircraft comprising the steps of:
driving a first AC generator at a first rotational speed;
driving a second AC generator at a second rotational speed different from the first speed;
rectifying the electric power from the first and second generators so that DC power is supplied directly to a common DC bus from the first AC generator and the second AC generator without paralleling AC power from the first AC generator and the second AC generator;
supplying power from the DC bus to electrical loads that produce an electrical power demand;
controlling electrical power output of the first and second AC generators by controlling their output voltage; and
allocating the electrical power demand among the first and second generators while maintaining the generators and the electrical loads interconnected with the common DC bus.

8. The method of claim 7 further comprising the steps of:
producing a first command signal at which the first generator produces power;
producing a second command signal at which the second generator produces power; and
wherein the step of allocating the electrical power requirement comprises varying the first and second command signals.

9. The method of claim 7 further comprising the step of:
operating the first generator as an engine starting motor for a first engine of the aircraft;
operating the second generator as an engine starting motor for a second engine of the aircraft; and
driving the starting motor for the first engine with electrical power from the second generator.

10. The method of claim 9 further comprising the step of supplying electrical power from the second generator to an electrical load other than the starting motor operation.

11. The method of claim 7 wherein the step of supplying power to a load is performed at an undiminished rate when either the first or the second generator does not produce power.

* * * * *